US011069942B2

(12) United States Patent
Shi et al.

(10) Patent No.: US 11,069,942 B2
(45) Date of Patent: Jul. 20, 2021

(54) SECONDARY BATTERY AND BATTERY MODULE

(71) Applicant: Contemporary Amperex Technology Co., Limited, Ningde (CN)

(72) Inventors: Dongyang Shi, Ningde (CN); Yuanbao Chen, Ningde (CN); Haizu Jin, Ningde (CN); Zhenhua Li, Ningde (CN); Ning Chen, Ningde (CN); Fei Hu, Ningde (CN); Tian Wu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 41 days.

(21) Appl. No.: 16/429,914

(22) Filed: Jun. 3, 2019

(65) Prior Publication Data

US 2020/0321591 A1    Oct. 8, 2020

(30) Foreign Application Priority Data

Apr. 2, 2019   (CN) .......................... 201910262108.0

(51) Int. Cl.
*H01M 2/30*    (2006.01)
*H01M 50/529*    (2021.01)
(Continued)

(52) U.S. Cl.
CPC ....... *H01M 50/529* (2021.01); *H01M 50/147* (2021.01); *H01M 50/531* (2021.01)

(58) Field of Classification Search
CPC ............ H01M 2/24; H01M 2/04; H01M 2/26; H01M 50/529; H01M 50/531; H01M 50/147
See application file for complete search history.

(56) References Cited

U.S. PATENT DOCUMENTS

| 2002/0146620 A1 | 10/2002 | Connell |
| 2005/0130037 A1* | 6/2005 | Kaneta ............. H01M 10/0436 |
| | | 429/178 |

(Continued)

FOREIGN PATENT DOCUMENTS

| CN | 103314468 | 9/2013 |
| CN | 103931017 | 7/2014 |

(Continued)

OTHER PUBLICATIONS

International Search Report dated Jun. 30, 2020 in PCT International Application No. PCT/CN2020/080659.

(Continued)

*Primary Examiner* — Olatunji A Godo
(74) *Attorney, Agent, or Firm* — Snell & Wilmer L.L.P.

(57) ABSTRACT

The present invention relates to a secondary battery and a battery module. The secondary battery includes: a casing including a receiving cavity having an opening; a top cover assembly, and an electrode assembly disposed in the receiving cavity, wherein the electrode assembly includes two end faces disposed opposite to each other in a first direction perpendicular to a depth direction of the receiving cavity, a lug extending from each end face; the lug is a layered structure and has a redundant section near the end face and a connecting section connected to the redundant section; the current collecting member includes a current collecting portion fixedly connected to the connecting section. The lug of the secondary battery of the embodiment of the present invention has the redundant section, which can effectively buffer the movement and reduce the possibility that the lug is torn or broken due to an excessive tensile stress.

16 Claims, 6 Drawing Sheets

(51) Int. Cl.
 H01M 50/147 (2021.01)
 H01M 50/531 (2021.01)

(56) References Cited

U.S. PATENT DOCUMENTS

2006/0051664 A1* 3/2006 Tasai .................. H01M 2/266
                                                    429/161
2012/0106026 A1  5/2012  Higashino et al.
2014/0349149 A1  11/2014 Kim

FOREIGN PATENT DOCUMENTS

| CN | 104126241 | 10/2014 |
| CN | 203983381 | 12/2014 |
| CN | 106415880 | 2/2017 |
| CN | 106684302 | 5/2017 |
| CN | 206250267 | 6/2017 |
| CN | 109428043 | 3/2019 |
| CN | 209217029 | 8/2019 |
| CN | 209217069 | 8/2019 |
| CN | 209217158 | 8/2019 |
| JP | 2007073317 | 3/2007 |
| JP | 2018006114 | 1/2018 |
| KR | 20080074239 | 8/2008 |
| WO | 2018186659 | 11/2018 |
| WO | 2018231605 | 12/2018 |
| WO | 2019059133 | 3/2019 |

OTHER PUBLICATIONS

Office Action dated Sep. 2, 2020 in Chinese Application No. 201910262108.01.
Supplemental Search Report dated Nov. 16, 2020 in Chinese Application No. 201910262108.01.

* cited by examiner

SECONDARY BATTERY AND BATTERY MODULE

CROSS-REFERENCE TO RELATED APPLICATIONS

This application claims priority to and the benefit of Chinese Patent Application No. CN201910262108.0, filed Apr. 2, 2019, entitled "SECONDARY BATTERY AND BATTERY MODULE," which is incorporated herein by reference in its entirety.

FIELD OF INVENTION

The present invention relates to the field of battery technologies, and in particular to a secondary battery and a battery module.

BACKGROUND OF THE INVENTION

With the development of science and technology, secondary batteries are widely used in portable electronic devices such as mobile phones, digital video cameras and laptop computers, and have broad application prospects in many large and medium-sized electric devices, such as electric cars, electric bicycles and other types of electric vehicles, and various energy storage facilities. Thus, secondary batteries become an important technical means to solve certain global problems, such as energy crisis and environmental pollution. A secondary battery typically includes a casing, an electrode assembly disposed inside the casing, and a current collecting member connected to the electrode assembly. The electrode assembly has a flat body portion and a lug extending from the body portion. However, since the lugs and the current collecting members are welded and fixed together, when the secondary battery is in use, the electrode assembly may vibrate up and down in the casing or expand and deform, thereby causing the portion of the lug that is not connected to the current collecting member to be subjected to a tensile stress, which may cause the problem of tearing or breaking the lug.

SUMMARY OF THE INVENTION

The embodiments of the present invention provide a secondary battery and a battery module. The lugs of the secondary battery have a redundant section, which can effectively buffer movements and reduce the chance of tearing or breaking the lugs due to an excessive tensile stress.

In one aspect, one or more embodiments of the present invention provides a secondary battery, comprising:

a casing, wherein the casing comprises a receiving cavity having an opening; a top cover assembly, wherein the top cover assembly is connected to the casing to seal the opening; an electrode assembly, which is disposed in the receiving cavity, the electrode assembly comprises two end faces disposed opposite to each other in a first direction perpendicular to a depth direction of the receiving cavity, and a lug extending from each of the end faces; the lug has a layered structure, the lug comprises a redundant section adjacent to the end face and a connecting section connected to the redundant section; and a current collecting member, wherein the current collecting member comprises a current collecting portion fixedly connected to the connecting section.

According to one aspect of the present invention, the top cover assembly and the electrode assembly are spaced apart to form a buffer gap, wherein in a depth direction, the height of the buffer gap is H1 and the height of the electrode assembly is H2, wherein $0.05 < H1/H2 < 0.3$.

According to one aspect of the present invention, the number of the electrode assemblies is two or more sets, the two or more sets of the electrode assemblies are stacked in the depth direction, each of the electrode assemblies comprises two electrode units, the electrode unit comprises sub-end faces and sub-lugs extending from the sub-end faces, two sub-end faces on the same side form the end face, and two sub-lugs of the same pole form the lug, the sub-lug of one of the electrode units extends from a region of the sub-end face close to the other electrode unit in the depth direction.

According to one aspect of the present invention, the electrode unit comprises two wide faces and two narrow faces connecting the two wide faces, the wide faces and the narrow faces are alternately disposed, two adjacent wide faces of the two electrode units are oppositely disposed in the depth direction to form a contact interface, and the lug extends from a region of the end face adjacent to the contact interface;

wherein in the depth direction, the contact interface is spaced apart from an end portion of the current collecting portion near the lug, and a minimum distance between the contact interface and a lowest point of the current collecting portion is H3, wherein $0.5 < H3/H1 < 0.9$.

According to one aspect of the present invention, the redundant section comprises a folding area and a collecting area, the folding area is located on one side of the current collecting member close to the end surface in the first direction, the collecting area connects the folding area and the connecting section; layers of the lug are welded and fixed to a region on the folding area close to the collecting area so as to form a welded portion.

According to one aspect of the present invention, the welded portion comprises a strip-shaped structure, the welded portion extends in a second direction perpendicular to the depth direction and the first direction, and the welded portion has a width of 0.5 mm to 2.5 mm.

According to one aspect of the present invention, the current collecting member further comprises an extending portion extending in the depth direction, the extending portion is connected to the current collecting portion and both have a sheet-like structure, a thickness direction of the extending portion and a thickness direction of the collecting portion are both arranged in parallel with the first direction, the collecting area is movable in the depth direction, and an extension length of the collecting area away from the end face is greater than a sum of the thickness of the extending portion and the thickness of the current collecting portion.

According to one aspect of the present invention, the folding area and the current collecting member at least partially overlap in the first direction.

According to one aspect of the present invention, the current collecting member further comprises an extending portion and a curved portion extending in the depth direction, the curved portion connects the extending portion and the current collecting portion, an outer peripheral surface of the curved portion faces the redundant section, and in the depth direction, the redundant section is movable toward or away from the curved portion.

The secondary battery according to one or more embodiments of the present invention comprises a casing, an electrode assembly, a top cover assembly, and a current collecting member. The electrode assembly comprises lugs. The lug has a redundant section and a connecting section. The connecting section of the lug is connected to a current collecting portion of the current collecting member. In this way, when the electrode assembly moves in the casing along the depth direction of a receiving cavity of the casing, the portions of the electrode assembly other than the connecting section move relative to the current collecting portion of the current collecting member, thereby pulling the redundant section of the lug to move relative to the current collection portion. Since the lug according to the embodiments has the redundant section, the redundant section is capable of buffering the potential deformation needed for the movement of the lug, thereby reducing the generation of excessive tensile stress within the lug as the movement of the lug is limited by the current collecting portion, which may cause tearing or breaking of the lug.

In another aspect of the present invention, one or more embodiments of the present invention provide a battery module, comprising two or more secondary batteries according to the above embodiments, wherein the two or more secondary batteries are arranged side by side in a direction intersecting the depth direction.

BRIEF DESCRIPTION OF THE DRAWINGS

The features, advantages and technical effects of some exemplary embodiments of the present invention will be described below with reference to the accompanying drawings.

Figure 1:
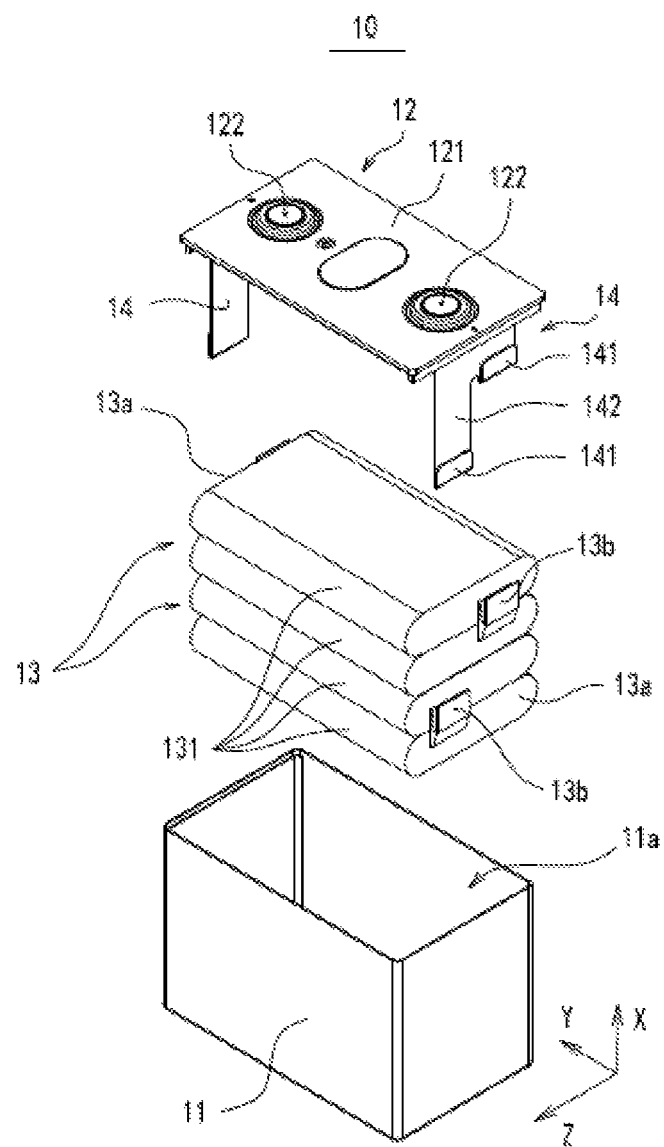
FIG. 1 is a schematic exploded structural view of a secondary battery according to an embodiment of the present invention.

In the figures, the drawings are not drawn to scale.
Description of the element symbols:
10. secondary battery;
11. casing; 11*a*. receiving cavity;
12. top cover assembly; 121. top cover; 122. pole;
13. electrode assembly; 13*a*. end face; 13*b*. lug; 13*c*. contact interface; 130*a*. redundant section; 1301. folding area; 1302. collecting area; 1303. welded portion; 130*b*. connecting section; 131. electrode unit; 131*a*. wide face; 131*b*. narrow face; 131*c*. sub-end face; 131*d*. sub-lug;
14. current collecting member; 141. current collecting portion; 142. extending portion; 143. curved portion;
20. buffer gap;
X. depth direction; Y. first direction, Z. second direction

DETAILED DESCRIPTION

The embodiments of the present invention will be further described in detail below with reference to the accompanying drawings and examples. The detailed description of the embodiments and the accompanying drawings are intended to describe the embodiments of the invention, rather than limiting the scope of the present invention. That is, the present invention is not limited to the embodiments described herein.

In the description of the present invention, it should be noted that "a plurality" means two or more unless otherwise stated; the terms "upper", "lower", "left", "right", "inner", "outer", "front end", "back end", "head", "tail" and other terms indicating the orientations or positional relationships are merely for the convenience of describing the present invention and simplifying the description; they do not indicate or imply that the device or component referred to must be in such a specific orientation, made in such a specific configuration or used in such a specific operation. Thus, they do not limit the present invention. Moreover, the terms "first", "second", "third", etc. are used for descriptive purposes only; they cannot be understood as indicating or implying the relative importance thereof.

The orientation terms used in the following description are all the directions shown in the drawings and are not intended to limit the specific structure of the invention. In the description of the present invention, it should also be noted that the terms "installation", "connected", and "coupled" should be understood broadly, unless otherwise explicitly stated and limited. For example, it may be a fixed connection, a detachable connection, or an integral connection; it may be directly connected, or indirectly connected through an intermediate medium. For those of ordinary skill in the art, the specific meaning of the above terms in the present invention can be understood under the specific conditions of the present invention.

In order to better understand the present invention, the embodiments of the present invention will be described in detail below with reference to FIGS. 1 to 6.

An embodiment of the present invention provides a battery module comprising: two or more secondary batteries 10 of the present embodiment and a bus bar for connecting the two secondary batteries 10. Two or more secondary batteries 10 are arranged side by side in the same direction. One end of the bus bar is fixedly connected to one of the two secondary batteries 10, and the other end thereof is connected and fixed to the other secondary battery 10. The two or more secondary batteries 10 of the present embodiment can be arranged side by side in the thickness direction thereof so as to form a battery module.

Figure 2:
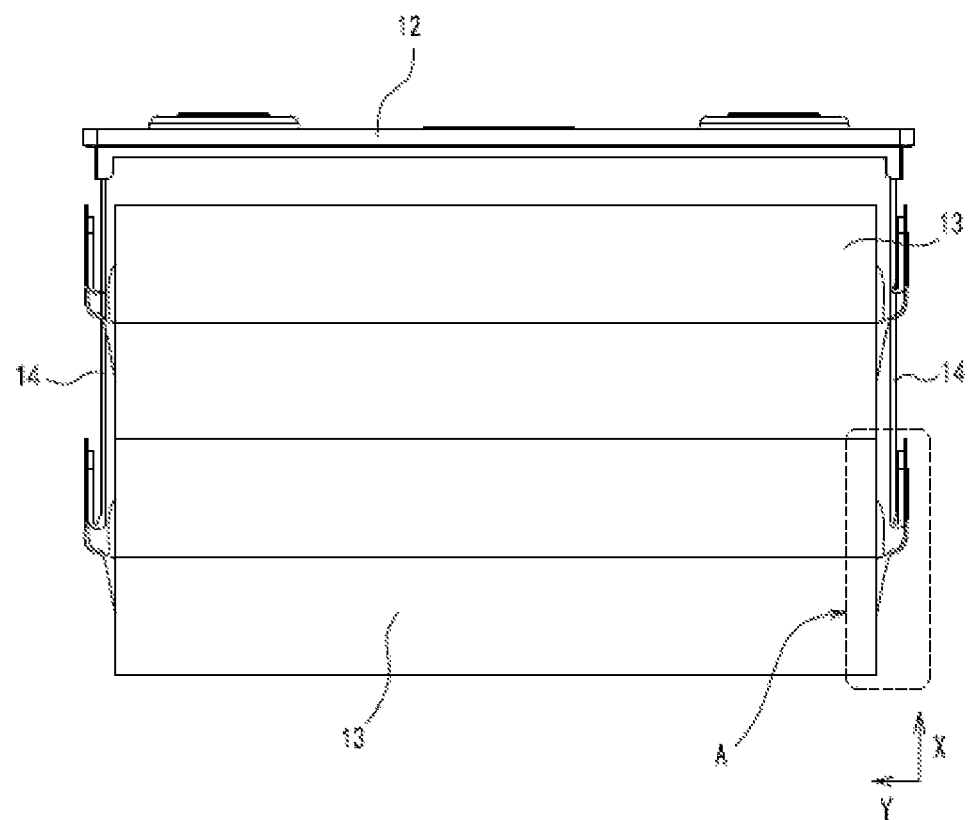
FIG. 2 is a schematic partial structural view of a secondary battery according to an embodiment of the present invention.

In reference to FIGS. 1 and 2, the secondary battery 10 according to an embodiment of the present invention comprises a casing 11, a top cover assembly 12 that is sealingly coupled to the casing 11, an electrode assembly 13 disposed in the casing 11, and a current collecting member 14 connected to the electrode assembly 13.

In this embodiment, the casing 11 may be in the shape of a quadrangular prism or another shape. The casing 11 includes a receiving cavity 11*a* having an opening. The receiving cavity 11*a* is for receiving the electrode assembly 13 and an electrolyte. The casing 11 can be made of a material such as aluminum, aluminum alloy or plastic.

The electrode assembly 13 of the embodiment of the present invention includes two end faces 13*a* and a lug 13*b* extending from each of the end faces 13*a*. The two end faces 13*a* are opposed to each other in a first direction Y perpendicular to a depth direction X of the receiving cavity 11*a*. In reference to FIG. 3, the lug 13*b* has a redundant section 130*a* close to the end face 13*a* and a connecting section 130*b* connected to the redundant section 130*a*. The connecting section 130*b* is away from the end face 13*a*. The electrode assembly 13 includes a main body having the two end faces 13a, and the lugs 13b are connected to the main body. The depth direction X of the receiving cavity 11a of the present embodiment is parallel to the extending direction of the receiving cavity 11a. The first direction Y is perpendicular to the depth direction X, where the term perpendicular used herein is not limited to a strictly perpendicular definition in the mathematical sense. In this embodiment, one lug 13b extends from each end face 13a of the electrode assembly 13.

In one embodiment, the number of electrode assemblies 13 is one set or two sets or more than two sets. A set of electrode assemblies 13 has two lugs 13b opposite each other in the first direction Y, one of which is a positive lug and the other serves as a negative lug. In addition, a set of electrode assemblies 13 includes two electrode units 131. The two electrode units 131 are stacked in the depth direction X. The electrode unit 131 has sub-end faces 131c and sub-lugs 131d extending from the sub-end faces 131c. Two sub-end faces 131c on the same side form an end face 13a. Two sub-lugs 131d of the same pole are combined to form the lug 13b. The sub-lugs 131d of one electrode unit 131 extend in the depth direction X from a region of the sub-end faces 131c near the other electrode unit 131, so that the respective sub-lugs 131d of the two electrode units 131 are close to each other and extend in a relatively short distance, so as to form the lug 13b that is fixed to the current collecting member 14. The respective sub-lugs 131d of the two electrode units 131 have the same extension length. In one example, when the number of the electrode assemblies 13 is two or more, the two or more electrode assemblies 13 are stacked in the depth direction X.

The electrode unit 131 of the present embodiment can form the main body and the sub-lugs 131d connect to the main body by stacking or winding a first pole piece, a second pole piece, and a diaphragm. The diaphragm is an insulator disposed between the first pole piece and the second pole piece. The electrode unit 131 of the embodiment includes a diaphragm, a first pole piece, a diaphragm and a second pole piece. In the present embodiment, the first pole piece is exemplified as a positive electrode piece, and the second pole piece is a negative electrode piece. Similarly, in other embodiments, the first pole piece may be a negative electrode piece, and the second pole piece is a positive electrode piece. In addition, a positive electrode active material is applied on a coating area of the positive electrode piece, and a negative electrode active material is applied on a coating area of the negative electrode piece. A plurality of uncoated regions extending from the main body is then used as the sub-lugs 131d. Therefore, the lug 13b formed by the collection of the sub-lugs 131d is a layered structure having a plurality of layers, that is, the lug 13b is a laminated structure of multi-layered pole pieces. One electrode unit 131 includes two sub-lugs 131d disposed opposite each other in the first direction Y; that is, the positive lug and the negative lug. The positive lug extends from the coating area of the positive electrode piece. The negative lug extends from the coating area of the negative electrode piece.

In one embodiment, each of the electrode units 131 is a flat structure having two wide faces 131a and two narrow faces 131b connecting the two wide faces 131a. The two wide faces 131a are oppositely arranged in the depth direction X. The wide face 131a and the narrow face 131b are alternately arranged. In the case where the two electrode units 131 are stacked, the adjacent two wide faces 131a are oppositely disposed in the depth direction X to form a contact interface 13c. The lug 13b extends from a region of the end face 13a close to the contact interface 13c. The sizes of the two sub-lugs 131d from the two electrode units 131 are substantially the same, which is advantageous for the consistency of the manufacturing process of the electrode units 131 and thus can reduce the manufacturing cost. In one embodiment, in a second direction Z, the ratio of the size of the lug 13b to the size of the end face 13a is 1/10 to 2/5. The second direction Z is perpendicular to the first direction Y and the depth direction X, where the term perpendicular used herein is not limited to a strictly perpendicular definition in the mathematical sense.

Figure 3:
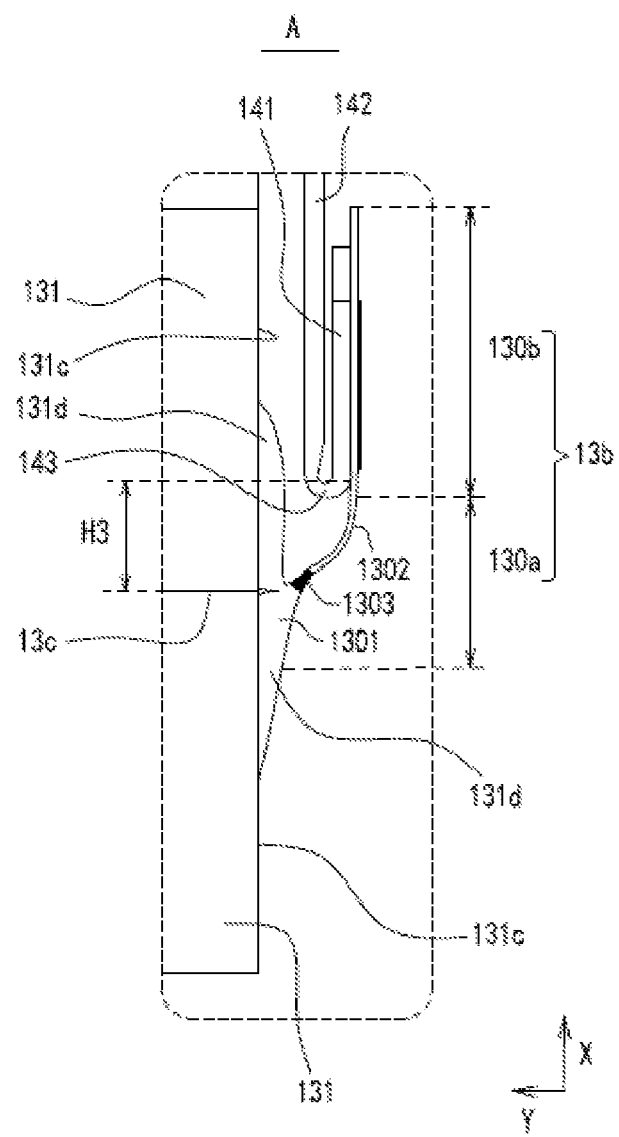
FIG. 3 is an enlarged view of the area A shown in FIG. 2.
Figure 4:
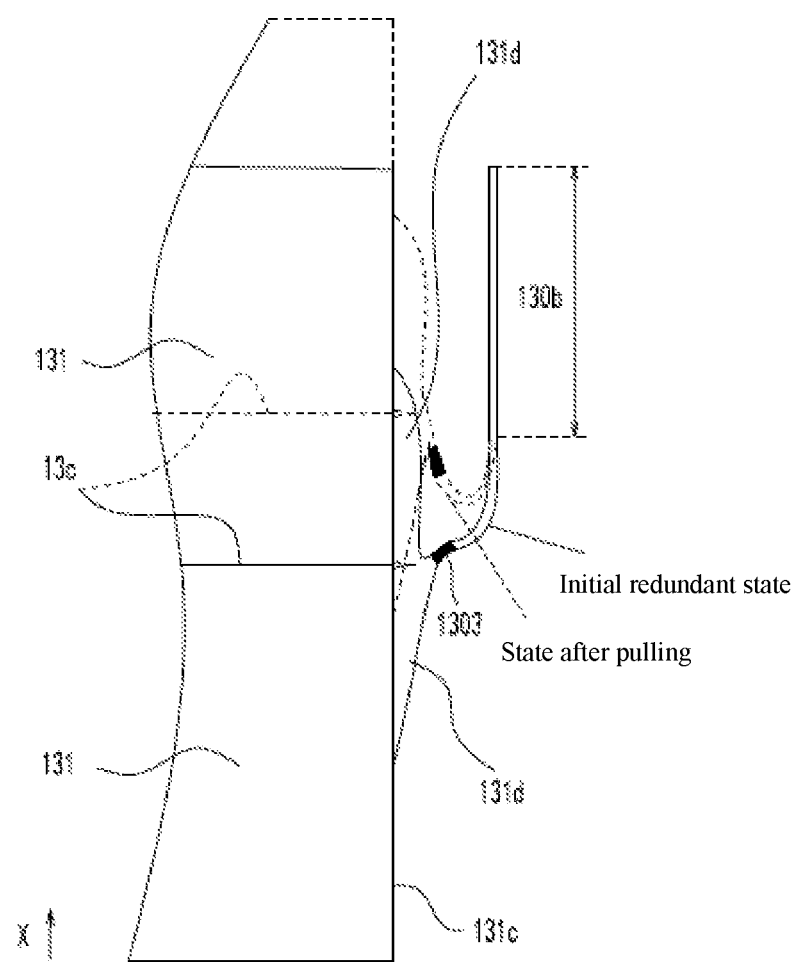
FIG. 4 is a schematic partial structural view of an electrode assembly according to an embodiment of the present invention.

In reference to FIGS. 1, 3 and 4, the current collecting member 14 of the embodiment of the present invention includes a current collecting portion 141, which is fixedly coupled to the lug 13b. The current collecting member 14 is fixedly coupled to the top cover assembly 12. When the electrode assembly 13 is moved or its size is changed, the position of the current collecting member 14 does not substantially move or change. When the secondary battery 10 is used, the main body of the electrode assembly 13 vibrates up and down in the depth direction X or expands during use, its size in the depth direction X increases. When the main body of the electrode assembly 13 moves in the depth direction X or expands and deforms, the main body of the electrode assembly 13 will drive the redundant section 130a of lug 13b to move. The redundant section 130a of the lug 13b of the embodiments of the present invention has a maximum reserved redundancy distortion. When the redundant section 130a is pulled in the depth direction X, the redundant section 130a can release the reserved redundancy deformation to buffer its own movement so that it is in a state of not bearing tensile stress until the redundant section 130a is pulled to the extent that is larger than its reserved redundancy deformation, in such a case, the redundant section 130a is in a state of bearing tensile stress when the maximum redundancy is exceeded. In this way, the redundant section 130a of the lug 13b in the embodiments of the present invention can effectively buffer the tensile stress applied on the lug 13b from the movement or deformation of the main body of the electrode assembly 13, thereby reducing the excessive load of the lug 13b, and the possibility of tearing or breaking the lug by the tensile stress. Alternatively, when the electrode assembly 13 moves in the depth direction X or expands and deforms, which causes the contact interface 13c to move, the main body of the electrode assembly 13 would pull the redundant section 130a of the lug 13b. In this case, the redundant section 130a of the lug 13b is pulled and deformed to buffer the tensile stress applied on the lug 13b when the contact interface 13c moves, thereby reducing the excessive load of the lug 13b, and the possibility of tearing or breaking the lug by the tensile stress.

The top cover assembly 12 of the present embodiments is coupled to the casing 11 to seal the opening thereon. In one embodiment, the top cover assembly 12 includes a top cover 121 and a pole 122. The top cover assembly 12 is sealingly coupled to the casing 11 via the top cover 121. The pole 122 is disposed on the top cover 121 and is electrically connected to the electrode assembly 13 through the current collecting member 14.

The top cover assembly 12 and the electrode assembly 13 of the present embodiment are spaced apart in the depth direction X to form a buffer gap 20. The buffer gap 20 serves to buffer the amount of expansion deformation of the electrode assembly 13 in the depth direction X. When at least one of the electrode units 131 in the electrode unit assembly 13 has an undesirable expansion, the height of the entire main body of the electrode unit 13 increases in the depth direction X. The expansion direction of the main body of the electrode assembly 13 is mainly toward the top cover assembly 12, so that the expansion deformation of the electrode assembly 13 preferentially presses against the buffer gap 20 without directly contacting the top cover assembly 12 and applying pressure to the top cover assembly 12. In this way, when the electrode assembly 13 expands, the electrode assembly 13 does not exert excessive compressive stress on the top cover assembly 12 which may cause the top cover assembly 12 to be disconnected from the casing 11. Thus, the occurrence of electrolyte leakage and the failure of the secondary battery 10 due to an overall structural damage can be avoided, and the structural integrity and safety of the secondary battery 10 are ensured.

Figure 5:
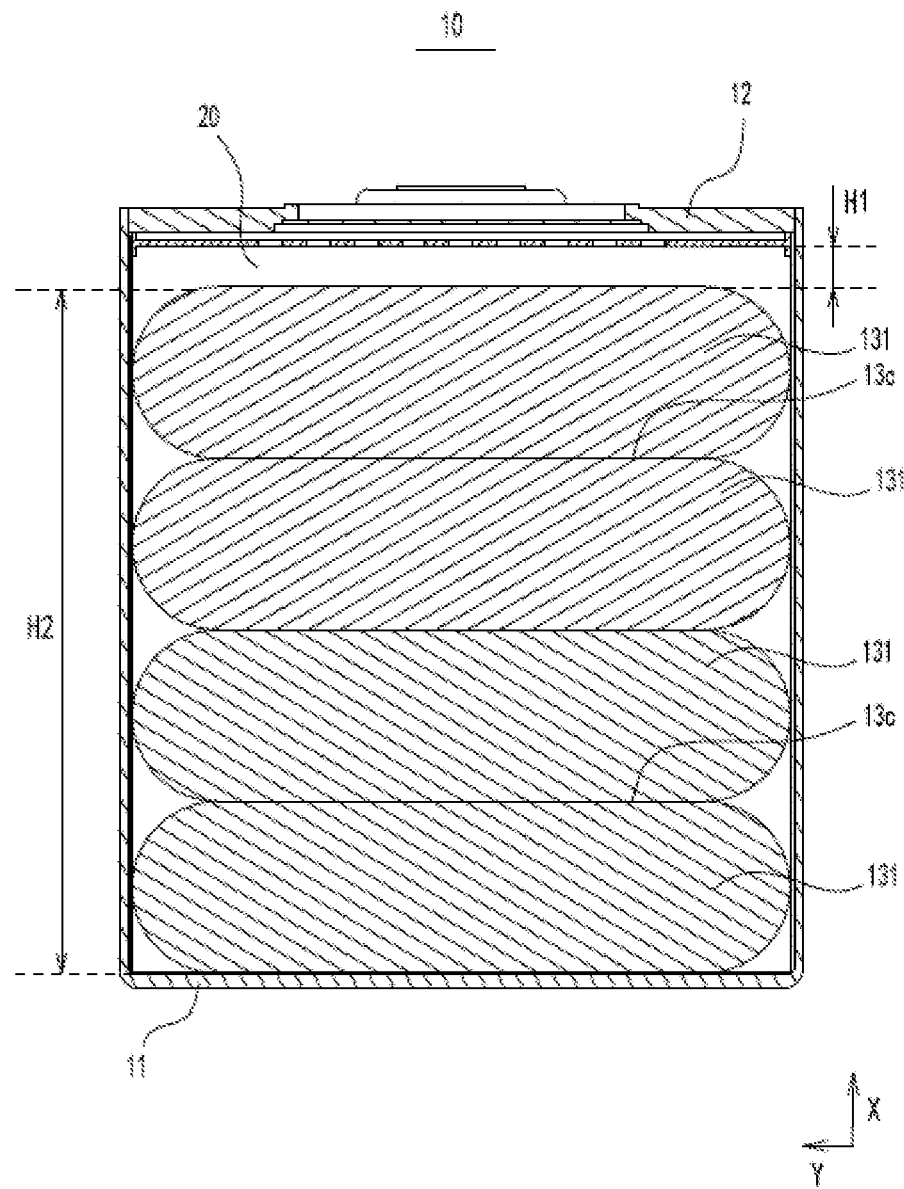
FIG. 5 is a cross-sectional structural view of a secondary battery according to an embodiment of the present invention.
Figure 6:
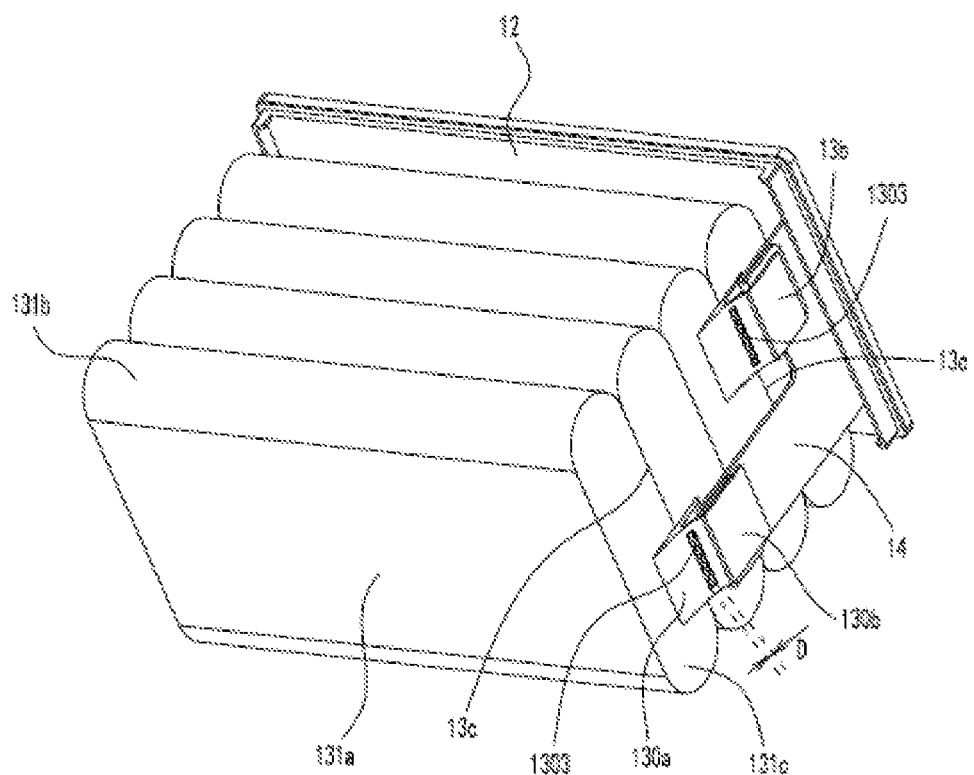
FIG. 6 is a schematic partial structural view of a secondary battery according to another embodiment of the present invention.

In one embodiment, in reference to FIG. 5, in the depth direction X of the receiving cavity 11a, the ratio of the height H1 of the buffer gap 20 (a measured value in the depth direction X) to the height H2 of the electrode assembly 13 (a measured value in the depth direction X) is from 0.05 to 0.3, that is, 0.05<H1/H2<0.3. When the ratio of the height H1 of the buffer gap 20 to the height H2 of the electrode assembly 13 is less than 0.05, the buffering effect of the buffer gap 20 is lowered, which cannot provide an effective buffering effect. When the ratio of the height H1 of the buffer gap 20 to the height H2 of the electrode assembly 13 is more than 0.3, the gap between the electrode assembly 13 and the top cover assembly 12 may be excessively large, resulting in an increase in the overall size of the secondary battery 10, which in turn may adversely affect the energy density of the secondary battery 10. In one embodiment, the height H1 of the buffer gap 20 is from 0.5 mm to 12 mm.

In one embodiment, as shown in FIG. 3, in the depth direction X, the contact interface 13c is spaced apart from an end portion of the current collecting portion 141 near the lug 13b, and the minimum distance between the contact interface 13c and the lowest point of the current collecting portion 141 is H3 (a measured value in the depth direction X), wherein 0.5<H3/H1<0.9. In one example, the contact interface 13c and the redundant section 130a are both located below the current collecting portion 141. The above and below mentioned herein use the depth direction X as a reference direction. When the redundant deformation of the redundant section 130a is at a minimum level, the redundant section 130a is a straight-line section extending obliquely upward. When the ratio of the minimum distance H3 between the contact interface 13c and the current collecting portion 141 to the height H1 of the buffer gap 20 is equal to 0.5, in addition the main body of the electrode assembly 13 is moved in the depth direction X by a distance equal to the height H1 of the buffer gap 20, and the contact interface 13c is moved in the depth direction X by a distance also equal to the height H1 of the buffer gap 20, the contact interface 13c would move above the current collecting portion 141, and its distance from the lowest point of the current collecting portion 141 is H3, in such a case, a region on the redundant section 130a close to the end face is located between the current collecting portion 141 and the end face. The redundant section 130a is pulled to a critical contact state with the current collecting portion 141, that is, the redundant section 130a in which the redundancy deformation is at a minimum level is in contact with the current collecting portion 141 but is not affected by the pressure from the current collecting portion 141 (the pressure is zero). Thus, when the ratio of the minimum distance H3 between the contact interface 13c and the current collecting portion 141 to the height H1 of the buffer gap 20 is less than 0.5, the main body of the electrode assembly 13 moves in the depth direction X by a distance equal to the height H1 of the buffer gap 20, and the contact interface 13c moves in the depth direction X by a distance equal to the height H1 of the buffer gap 20, in this case, the redundant section 130a is in contact with the current collecting portion 141 and is subjected to the pressure of the current collecting portion 141, so that the redundant section 130a is subjected to the tensile stress, and there is a possibility of being torn or broken. When the ratio of the minimum distance H3 between the contact interface 13c and the current collecting portion 141 to the height H1 of the buffer gap 20 is greater than or equal to 0.9, the extension length of the redundant section 130a is relatively large, so that when the main body of the electrode assembly 13 moves in the depth direction X in a distance equal to the height H1 of the buffer gap 20, and the contact interface 13c moves in the depth direction X in a distance also equal to the height H1 of the buffer gap 20, the redundant section 130a could be excessively bent or has a large number of bends within the space between the end face and the casing 11. As a result, it is easy to cause the occurrence of short-circuiting of the electrode assembly 13 by the bending or breaking of the redundant segment 130a or by the reverse insertion of the end face into the main body of the electrode assembly 13. Therefore, the ratio of the minimum distance H3 between the contact interface 13c and the current collecting portion 141 and the height H1 of the buffer gap 20 should be less than 0.9 in order to reduce the occurrence of the aforementioned malfunction.

In one embodiment, in reference to FIGS. 3 and 4, the redundant section 130a includes a folding area 1301 and a collecting area 1302. The folding area 1301 is located on the side of the current collecting member 14 close to the end face in the first direction Y. The collecting area 1302 connects the folding area 1301 and the connecting section 130b. In reference to FIG. 6, the layers of the lug 13b are welded and fixed in a region of the folding region 1301 close to the collecting area 1302 so as to form a welded portion 1303. In one example, the welded portion 1303 is formed by ultrasonically welding the respective pole pieces of the lug 13b so that the layers are joined and fixed. The portion of the folding area 1301 between the end face 13a and the welded portion 1303 is separated from the collecting area 1302 by the welded portion 1303.

The pole pieces in the portion of the folding area 1301 between the end face 13a and the welded portion 1303 are in a fluffy and free state. When the redundant section 130a is pulled to move in the depth direction X, the layers of pole pieces included in the portion of the folding area 1301 between the end face 13a and the welded portion 1303 and the collecting area 1302 are freely movable, while the layers of pole pieces included in the portion corresponding to the welded portion 1303 are not freely movable. In this way, when the redundant section 130a is pulled in the depth direction X, the bending degrees of the layers of pole pieces included in the portion of the folding area 1301 between the end face 13a and the welded portion 1303 and the collecting area 1302 is relatively small. Accordingly, the welded portion 1303 can prevent the layers of the pole pieces included in both the folding area 1301 and the collecting area 1302 from being bent too much and thus reversely inserted into the main body of the electrode assembly 13 through the end face, thereby reducing the possibility of short circuit of the electrode assembly 13. In one embodiment, the welded portion 1303 is a strip-shaped structure, and the welded portion 1303 extends in the second direction Z perpendicular to the depth direction X and the first direction Y. Optionally, the width D of the welded portion 1303 is from 0.5 mm to 2.5 mm. When the width D of the welded portion 1303 is less than 0.5 mm, the width D of the welded portion 1303 is too narrow, and accordingly the layers of the respective pole pieces cannot be connected and fixed well in the folding region 1301, so that the bending degree of the respective layers cannot be effectively limited. The width direction of the welded portion 1303 is the same as the extending direction in which the lug 13b extends away from the end face 13a. When the width D of the welded portion 1303 is greater than 2.5 mm, the width D of the welded portion 1303 is too large, which tends to cause a decrease in the overall bending deformation ability of the folding area 1301. When the main body of the electrode assembly 13 is pulled and moved, the portion in the folding area 1301 adjacent to the welded portion 1303 is prone to bending and breaking.

In reference to FIG. 1, the current collecting member 14 of the embodiments of the present invention further includes an extending portion 142 extending in the depth direction X.

The current collecting portion 141 has a connecting end extending in the second direction Z.

The current collecting portion 141 is connected to an end portion of the extending portion 142 away from the top cover assembly 12 through the connecting end. The extending portion 142 is disposed to intersect the current collecting portion 141.

In one embodiment, the extending portion 142 is connected to the current collecting portion 141, and both of them have a sheet-like structure. The thickness direction of the extending portion 142 and the thickness direction of the current collecting portion 141 are disposed in parallel with the first direction. The collecting area 1302 is movable in the depth direction X. The extension length of the collecting area 1302 away from the end face is greater than a sum of the thickness of the extending portion 142 and the thickness of the current collecting portion 141. In this way, when the main body of the electrode assembly 13 is moved upward by a predetermined maximum distance, a portion of the collecting area 1302 is located between the current collecting portion 141 and the casing 11, and another portion thereof is located between the current collecting portion 141 and the end face, so as to make the collecting area in a U-shape. Since the extending length of the collecting area 1302 away from the end face is greater than the sum of the thickness of the extending portion 142 and the current collecting portion 141, no interactive compressive stress is generated between the collecting area 1302 and the current collecting portion 141, thereby ensuring that the collecting area 1302 does not bear the tensile stress, and reducing the possibility of tearing or breaking the pole pieces corresponding to the collecting area 1302. In one example, the folding area 1301 and the current collecting member 14 at least partially overlap in the first direction Y. The portion of the folding area 1301 near the end surface is referred to as the root portion thereof, and at least a portion of the root portion of the folding area 1301 overlaps with the current collecting member 14.

In one embodiment, the number of the extending portion 142 is two or more. The number of the electrode assembly 13 is two or more. The two or more extending portions 142 are spaced apart in the second direction Z. The extending portions 142 are arranged in one-to-one correspondence with the current collecting portions 141. The number of the extending portion 142 is the same as the number of the current collecting portions 141. In one example, the number of the extending portion 142 and the number of the current collecting portions 141 are the same as the number of the electrode assemblies 13, and the extending portions 142 and the current collecting portions 141 are arranged in one-to-one correspondence with the lugs 13b. All of the electrode assemblies 13 can be charged or discharged through one current collecting member 14 of the present embodiment, thereby reducing the number of parts, ensuring a compact internal layout of the secondary battery 10, and helping to increase the energy density of the secondary battery 10. The current collecting portions 141 are spaced apart in the depth direction X, and correspondingly, the respective lugs 13b extending from the respective sets of electrode assemblies 13 are also spaced apart in the depth direction X. Further, each of the extending portions 142 does not overlap in the depth direction X, and the respective lugs 13b also do not overlap in the depth direction X. Thus, since the current collecting portions 141 and the lugs 13b are disposed one by one, the respective current collecting portions 141 and the respective lugs 13b are staggered in the depth direction X. On the one hand, this arrangement facilitates the heat dissipation of the respective connecting regions; on the other hand, it facilitates the sequential welding operation of the respective current collecting portions 141 and the respective lugs 13b during a connection process, such that they do not interfere with each other. Since the two or more extending portions 142 are spaced apart in the second direction Z and at the same time the extending portions 142 are spaced apart in the depth direction X, when the respective current collecting portions 141 have the welding operation with the corresponding respective lugs 13b, the adjacent two current collecting portions 141 or the adjacent two extending portions 142 do not have positional interference with each other, which may result in failure to weld or increase the difficulty to weld. Optionally, the end portions of the two or more extending portions 142 are offset from each other in the second direction Z and do not overlap in the depth direction X, and the end portions are arranged in a stepwise manner in the depth direction X. Accordingly, the two or more current collecting portions 141 and the two or more lugs 13b are also arranged in a stepwise manner in the depth direction X.

In one embodiment, the current collecting portion 141 has a connecting face that is fixedly coupled to the lug 13b, and a surface of the collecting portion 141 away from the extending portion 142 forms a connecting face. The connecting section 130b of the lug 13b is disposed in a region between the current collecting portion 141 and the casing 11 and is connected to the connecting face of the current collecting portion 141 away from the extending portion 142. In the case of two or more current collecting portions 141, the connecting faces of the current collecting portions 141 all face away from the top cover assembly 12.

Optionally, the current collecting portion 141 is a sheet-like structure, and the thickness direction of the current collecting portion 141 is parallel to the first direction Y. The current collecting portion 141 is folded with respect to the first direction Y such that the connecting face faces the casing 11. After the current collecting portion 141 is connected and fixed to the lug 13b, the current collecting portion 141 is subjected to a folding operation, thereby reducing the size of the current collecting portion 141 in the first direction Y, which is advantageous for reducing the space occupancy of a connection structure formed by the current collecting portion 141 and the connecting section 130b of the lug 13b, thereby helping to increase the energy density of the secondary battery 10. Preferably, the connecting face of the current collecting portion 141 faces the casing 11. The connecting section 130b of the lug 13b connected to the connecting face of the current collecting portion 141 will not come into contact with the electrode assembly 13 due to the isolation effect from the collecting portion 141 and the extending portion 142. Thus, the possibility that the connecting section 130b of the folded lug 13b may scratch or puncture the electrode assembly 13 is reduced.

In reference to FIG. 3, the current collecting member 14 of the present embodiment further includes a curved portion 143. The curved portion 143 connects the extending portion 142 and the current collecting portion 141. The outer peripheral surface of the curved portion 143 faces the redundant section 130a. In the depth direction X, when the main body of the electrode assembly 13 moves, the redundant section 130a can move toward or away from the curved portion 143. In one embodiment, the redundant section 130a is located below the current collecting portion 141. The main body of the electrode assembly 13 moves upward, and after the contact interface 13c moves upward by a predetermined distance, the redundant section 130a comes into contact with the curved portion 143. The outer peripheral surface of the curved portion 143 of the present embodiment facing the redundant section 130a is a circular arc surface. Therefore, after the redundant section 130a is in contact with the curved portion 143, the outer peripheral surface of the curved portion 143 would apply an even force on various regions of the redundant section 130a. The resulting equalized compressive stress reduces the possibility that the curved portion 143 exerts excessive compressive stress on the portion of the redundant segment 130a to cause stress concentration on some part of the redundant segment 130a, thereby reducing the possibility of the curved portion 143 piercing the redundant section 130a.

The secondary battery 10 of the embodiment of the present invention includes a casing 11, an electrode assembly 13, a top cover assembly 12, and a current collecting member 14. The electrode assembly 13 includes a lug 13b. The lug 13b has a redundant section 130a and a connecting section 130b. The connecting portion 130b of the lug 13b is connected to the current collecting portion 141 of the current collecting member 14. When the electrode assembly 13 moves within the casing 11 in the depth direction X of the receiving cavity 11a of the casing 11, the portion of the electrode assembly 13 other than the connecting section 130b will move relative to the current collecting portion 141 of the current collecting member 14. Thus, the redundant section 130a of the lug 13b is pulled to have a relative movement with respect to the current collecting portion 141. Since the lug 13b of the present embodiment has the redundant section 130a, the redundant section 130a can buffer the deformation caused by the movement of the lug 13b, thereby reducing the possibility that when the lug 13b moves, it may generate excessive tensile stress therein due to the restriction from the current collecting portion 141, which may cause tearing or breaking the lug 13b.

Although the present invention has been described with reference to the preferred embodiments thereof, various modifications may also be made thereto, and the components may be replaced with equivalents without departing from the scope of the present invention. In particular, the technical features mentioned in the various embodiments can be combined in any manner as long as there is no structural conflict. The present invention is not limited to the specific embodiments disclosed herein, but includes all technical solutions falling within the scope of the claims.

We claim:

1. A secondary battery, comprising:
a casing, wherein the casing comprises a receiving cavity having an opening;
a top cover assembly, wherein the top cover assembly is connected to the casing to seal the opening;
an electrode assembly, which is disposed in the receiving cavity, the electrode assembly comprises two end faces disposed opposite to each other in a first direction perpendicular to a depth direction of the receiving cavity, and a lug extending from each of the end faces; the lug has a layered structure, the lug comprises a redundant section adjacent to the end face and a connecting section connected to the redundant section;
a current collecting member, wherein the current collecting member comprises a current collecting portion fixedly connected to the connecting section wherein the top cover assembly and the electrode assembly are spaced apart to form a buffer gap, in the depth direction, the height of the buffer gap is H1 and the height of the electrode assembly is H2, wherein $0.05 < H1/H2 < 0.3$.

2. The secondary battery according to claim 1, wherein:
the number of the electrode assemblies is two or more sets, the two or more sets of the electrode assemblies are stacked in the depth direction, each of the electrode assemblies comprises two electrode units, each of the electrode units comprises two sub-end faces and a sub-lug extending from each of the two sub-end faces, the two sub-end faces on the same side in the first direction form the end face, and the two sub-lugs on the same side in the first direction form the lug; in each of the electrode assemblies, the sub-lug of each of the electrode units extends from a region of the sub-end face close to the other electrode unit in the depth direction.

3. The secondary battery according to claim 2, wherein:
the electrode unit comprises two wide faces and two narrow faces connecting the two wide faces, the wide faces and the narrow faces are alternately disposed; in each of the electrode assemblies, two adjacent wide faces of the two electrode units are oppositely disposed in the depth direction to form a contact interface, and the lug extends from a region of the end face adjacent to the contact interface;
in the depth direction, the contact interface is spaced apart from an end portion of the current collecting portion, and a minimum distance between the contact interface and the current collecting portion is H3, wherein $0.5 < H3/H1 < 0.9$.

4. A secondary battery, comprising:
a casing, wherein the casing comprises a receiving cavity having an opening;
a top cover assembly, wherein the top cover assembly is connected to the casing to seal the opening;
an electrode assembly, which is disposed in the receiving cavity, the electrode assembly comprises two end faces disposed opposite to each other in a first direction perpendicular to a depth direction of the receiving cavity, and a lug extending from each of the end faces; the lug has a layered structure, the lug comprises a redundant section adjacent to the end face and a connecting section connected to the redundant section;
a current collecting member, wherein the current collecting member comprises a current collecting portion fixedly connected to the connecting section, wherein the redundant section comprises a folding area and a collecting area, the folding area is located on one side of the current collecting member close to an end surface of the current collecting member in the first direction, the collecting area connects between the folding area and the connecting section; layers of the lug are welded and fixed to a region on the folding area close to the collecting area so as to form a welded portion.

5. The secondary battery according to claim 4, wherein the welded portion has a strip-shaped structure, the welded portion extends in a second direction perpendicular to the depth direction and the first direction, and the welded portion has a width of 0.5 mm to 2.5 mm.

6. The secondary battery according to claim 4, wherein the current collecting member further comprises an extending portion extending in the depth direction, the extending portion is connected to the current collecting portion and both have a sheet-like structure, a thickness direction of the extending portion and a thickness direction of the current collecting portion are both arranged in parallel with the first direction, the collecting area is movable in the depth direction, and an extension length of the collecting area away from the end face is greater than a sum of a thickness of the extending portion and a thickness of the current collecting portion.

7. The secondary battery according to claim 4, wherein the folding area and the current collecting member at least partially overlap in the first direction.

8. A secondary battery, comprising:
   a casing, wherein the casing comprises a receiving cavity having an opening;
   a top cover assembly, wherein the top cover assembly is connected to the casing to seal the opening;
   an electrode assembly, which is disposed in the receiving cavity, the electrode assembly comprises two end faces disposed opposite to each other in a first direction perpendicular to a depth direction of the receiving cavity, and a lug extending from each of the end faces; the lug has a layered structure, the lug comprises a redundant section adjacent to the end face and a connecting section connected to the redundant section;
   a current collecting member, wherein the current collecting member comprises a current collecting portion fixedly connected to the connecting section, wherein the current collecting member further comprises an extending portion and a curved portion extending in the depth direction, the curved portion connects the extending portion and the current collecting portion, an outer peripheral surface of the curved portion faces the redundant section, and in the depth direction, the redundant section is movable toward or away from the curved portion.

9. A battery module, comprising two or more secondary batteries according to claim 1, wherein the two or more secondary batteries are arranged side by side in a direction intersecting the depth direction.

10. A battery module, comprising two or more secondary batteries according to claim 2, wherein the two or more secondary batteries are arranged side by side in a direction intersecting the depth direction.

11. A battery module, comprising two or more secondary batteries according to claim 3, wherein the two or more secondary batteries are arranged side by side in a direction intersecting the depth direction.

12. A battery module, comprising two or more secondary batteries according to claim 4, wherein the two or more secondary batteries are arranged side by side in a direction intersecting the depth direction.

13. A battery module, comprising two or more secondary batteries according to claim 5, wherein the two or more secondary batteries are arranged side by side in a direction intersecting the depth direction.

14. A battery module, comprising two or more secondary batteries according to claim 6, wherein the two or more secondary batteries are arranged side by side in a direction intersecting the depth direction.

15. A battery module, comprising two or more secondary batteries according to claim 7, wherein the two or more secondary batteries are arranged side by side in a direction intersecting the depth direction.

16. A battery module, comprising two or more secondary batteries according to claim 8, wherein the two or more secondary batteries are arranged side by side in a direction intersecting the depth direction.

* * * * *